Feb. 24, 1942.  M. G. FONTANA ET AL  2,274,541
EROSION-CORROSION TESTING DEVICE
Filed Jan. 25, 1940  2 Sheets-Sheet 2

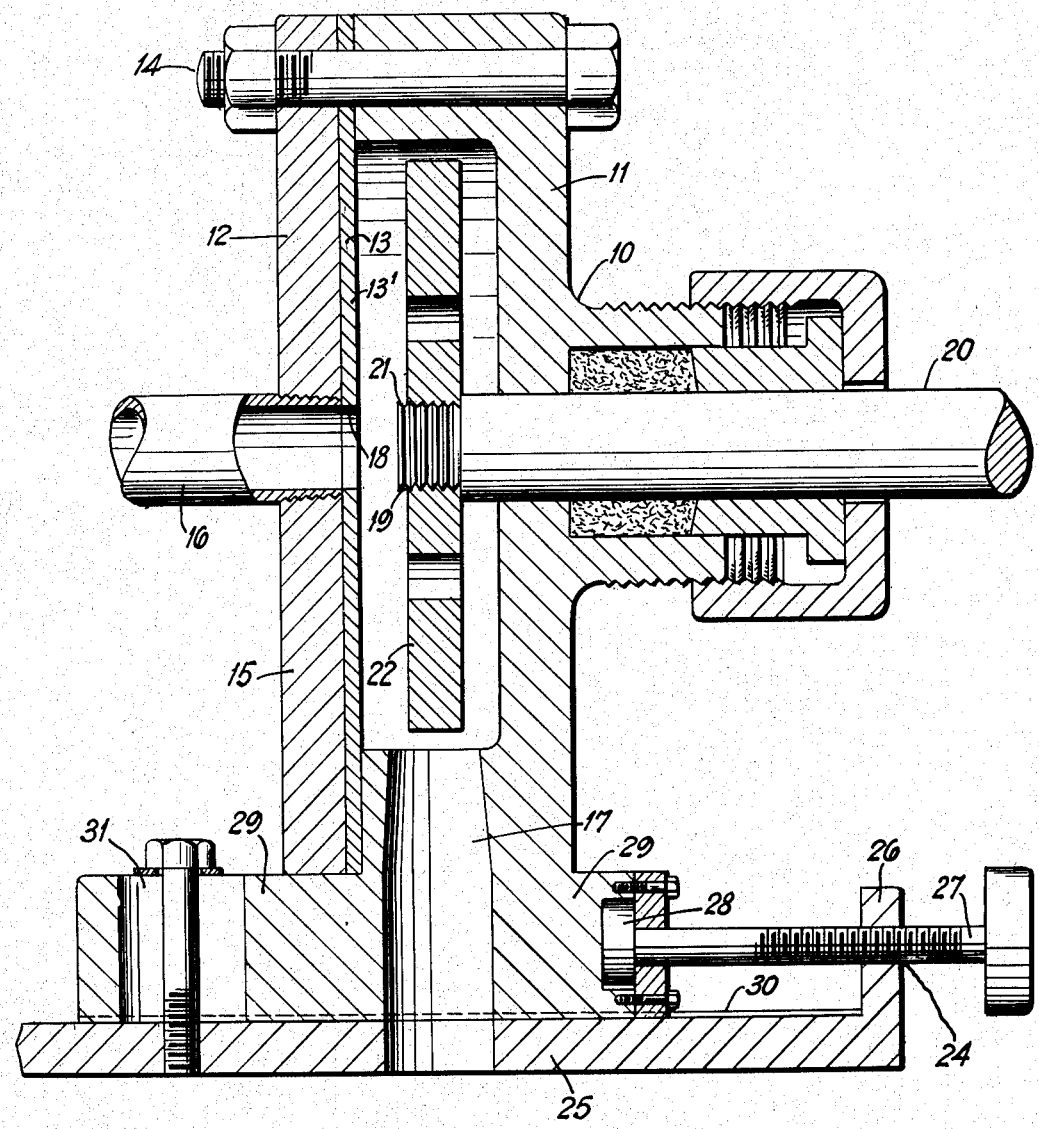

INVENTORS
M. G. Fontana
BY G. R. Cantwell
P. G. Schwab Jr.
ATTORNEY

Patented Feb. 24, 1942

2,274,541

UNITED STATES PATENT OFFICE 2,274,541

EROSION-CORROSION TESTING DEVICE

Marselio Guido Fontana, Kenmore, N. Y., and Garrett Reed Cantwell and Philip George Schwaab, Jr., Baltimore, Md., assignors to E. I. du Pont de Nemours & Company, Wilmington, Del., a corporation of Delaware Application January 25, 1940, Serial No. 315,508

7 Claims. (Cl. 73—51)

This invention relates to novel means for determining the relative erosion and/or corrosion-resistance characteristics of various materials, especially those of a metallic nature, which come in contact with corrosive or erosive media during use. More particularly, it relates to a novel means for determining, under conditions of actual or approximated use, the wearing and corrosion-resistance qualities of metallic objects, such as receptacles, containers, and the like, or component parts of the same, towards acidic or like corrosive media with which they come in contact during employment in commercial plant equipment.

Heretofore, the corrosion-resistance properties of materials employed in various commercial adaptations have been determined by immersing such materials or sample parts thereof in the contacting liquor or other media for a definite period of time, following which the extent of attack or resulting erosive action inflicted thereon is noted. Such methods often prove very unsatisfactory, principally because actual working or plant conditions are not simulated during the test, and the final results are merely approximate and insufficient for resolving definite and conclusive determinations.

It has been found that these and other disadvantages in prior testing procedures can be effectively overcome. It is among the objects of this invention, therefore, to provide novel means for affording such result. A salient object of the invention is to provide a novel means for accurately determining the corrosion and erosion-resistance properties of a given substance towards a corrosive or erosive liquor and to effect such determination under actual or approximate conditions of use. Other objects include the provision of a relatively simple, inexpensive apparatus for determining such corrosion-resistance characteristics, while concurrently determining the corrosion or wearing qualities possessed by the material under test; to effect these determinations under conditions of actual or simulated plant practice; and to provide means for controlling and determining the effects which such variables as temperature, acid concentration, solids contents, addition agents, etc., have upon the deteriorating propensities of the materials under test. Other objects and advantages of the invention will be apparent from the ensuing description and accompanying drawings, wherein Fig. 1 is a vertical sectional view of one form of device adapted for use in our invention;

Fig. 2 is a side elevational view of one preferred method of adapting the device shown in Fig. 1 to a particular use; while.

Figure 3:
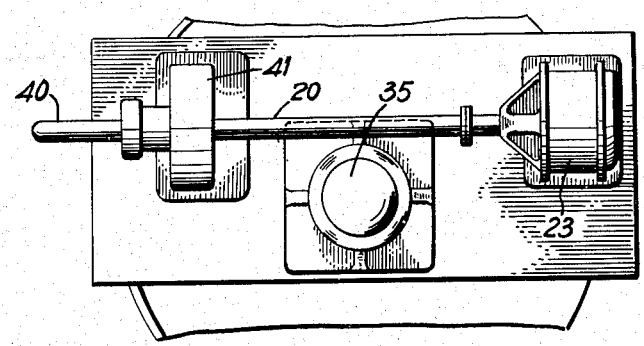
Fig. 3 is a plan view of the arrangement shown in Fig. 2.

In accordance with our invention, the relative effect of an acidic or other type of corrosive or erosive liquor upon a metallic element, vessel or other material employed as a container or contacting means therefor, is readily and accurately determined by subjecting the vessel itself, or, preferably, a component part or sample test piece thereof, to direct contact with the acting liquor, effecting such contact under conditions conducive to promoting or intensifying the corrosion or erosion action of said liquor, but which, preferably, substantially parallel or duplicate those which exist during actual, commercial use of the container, vessel or material under test.

In one particular embodiment, these determinations are arrived at by directing or impinging said acting liquor, preferably at relatively high velocity and while in a relatively restricted or confined stream, against and/or over a surface of the element under test while concurrently subjecting said element to high speed, rotary movement, and thereafter, upon lapse of a sufficient predetermined time period, ascertaining the extent of erosion and/or corrosion or lack thereof which has been exerted upon the element under test.

Referring to the drawings, which are merely diagrammatic and not to scale, and particularly to Fig. 1 thereof, illustrating a preferred form of our testing device, there is shown a metallic, corrosion-resistant casing 10, comprising section members 11 and 12, between which, and as shown, a removable wear plate or member 13 is interpositioned. The casing sections and wear plate are secured in operative relationship by means of the bolt and screw arrangement 14, or by any other conventional means. An internal chamber 15 is provided within the casing 10, said chamber, preferably, being in open communication with a casing inlet 16 and a casing outlet 17, the aperture 18 in the wear plate 13 preferably forming a continuation of inlet 16 leading to said chamber 15. Operatively positioned within said casing 10 and chamber 15 and adapted for rotary movement therein is a rotor element 19 made up of a corrosion-resistant drive shaft 20, provided with a screw-threaded or other type of terminus 21, which projects into the substantial central portion of the chamber 15, as shown. Removably secured to said terminus is a sample or test piece 22 comprising the material or metal component to be subjected to liquor attack. Said test piece may be of any desired size or shape, but preferably is in the form of a relatively thin, flat disc which is adapted for high speed, rotary movement within said chamber 15. Suitable means, such as motor 23 (Fig. 2) communicates with the drive shaft 20 whereby upon imparting rotary movement to said shaft, like movement is imparted to the test piece 22 secured on the terminus portion thereof. Preferably, and as shown, a surface of the test piece parallels substantially a facing surface 13' of the removable wear plate 13, whereby a relatively restricted, elongated passage becomes provided, through and between which the testing liquid is caused to flow and for a purpose to be more fully described hereinafter. The stationary plate 13 is so positioned within casing 10 as to be readily adjustable prior to use, whereby one may alter and control at will the extent of the spaced relationship which is to exist between the opposing surfaces of said test piece and the stationary plate 13 during the actual testing operation. This may be accomplished, for instance, by means of a screw arrangement 24 (Fig. 1) suitably, and as shown, associated with the casing element 10. Said screw arrangement comprises a base portion 25, provided with a rigid, upstanding flange or bracket member 26, through which an adjusting member 27 is screw-threadedly tapped. One end of the adjusting member 27 is suitably keyed, as by means of the slotted arrangement 28, to either the casing 10 or, preferably, to a slidable member 29, mounted for movable engagement in a runner or guide track 30, fashioned or slotted in the base plate 25. A slot and bolt arrangement 31 is also provided in the sliding member 29, whereby said member may be releasably secured to said base portion 25 and functions to retain said slidable member 29 in fixed relationship in respect to said base member when the device is in operation. Further, by providing the runner or guide track 30, straight line motion corresponding to the slots in the base or casing plate 25 becomes assured.

In operation of a device such as described, the test piece or specimen 22 is first measured and weighed, as is the wear plate 13. The test piece is then secured directly to the terminus 21 of the shaft 20, or, if desired, is fixedly secured to a suitable disc element fixed or otherwise disposed on said terminus. The stationary plate 13 and section 12 are then likewise assembled in secured relationship with the casing section 11. The clearance between the wear plate and test disc is then adjusted or varied, as desired, through the medium of the screw arrangement 24. Thus, when the screw 27 is rotated, the slidable element 29 is caused to move along the guide track 30, inducing like movement to the casing assembly 10. Since the shaft and rotor element are maintained in stationary, non-slidable position, movement of said casing 10 effects a variance in the distance between the opposing surfaces of the wear plate 13 and the rotor 19 or disc element 22. Upon adjustment to desired clearances therebetween, actuation of the bolt in the slot and bolt arrangement 31 secures said slidable member 29 to the base plate 25, as a result of which the device becomes ready for use. If desired, adjustment of the clearance between the opposing faces of the stationary plate and rotor or disc member may be effected prior to or during assembly. Rotary motion is then caused to be imparted to the drive shaft 20, causing like actuation to the test piece or disc 22 and an acidic or other type of corrosive or erosive liquor, the action of which is desired to be determined upon the material under test, is then introduced and at relatively high velocity through the casing inlet 16. Preferably, said inlet is so positioned in relation to the surface of the disc 22 that said liquor is caused to discharge or impinge thereagainst at substantially the central or axial portion of said disc. As a result, the rotating disc exerts an opposing, centrifugal action or force upon the liquid being introduced into the casing, causing the same to disperse in a radial direction within and through the confined space or restricted passage which is provided by reason of the close proximity of the opposing surfaces of the test piece 22 and the wear plate 13. The liquid is then caused to pass over the external edge or periphery of the test piece and out of the chamber 15 through the outlet 17 to a point of discharge. After the desired time period of test has elapsed, movement of the drive shaft and test piece is interrupted, the casing 10 is dismantled, the wear plate 13 and test piece 22 are removed and said plate and test piece again weighed and measured to determine the rate and extent of attack which has been incurred by reason of such liquor treatment, e. g., the extent of erosion and/or corrosion which has been exerted upon the material or metal under test by reason of liquor action.

The testing device of our invention, in addition to being useful for determining the effect which temperatures, acid concentration, solids content, rate of flow, additions to acid slurry and other variables have upon plant equipment, due to contact of acidic liquors therewith, is also very useful for determining the deterioration which metallic commercial plant equipment, such as pumps, agitators, flow meters, valves, etc., undergo while in use. It is especially useful for determining the erosion-corrosion action which acidic liquors exert upon waste acid or other types of centrifugals, and particularly for determining the corrosive or other action upon equipment employed in titanium oxide producing operations, wherein titanium solutions, such as titanium sulfate or chloride, are employed and hydrolyzed under elevated temperatures.

Figure 2:
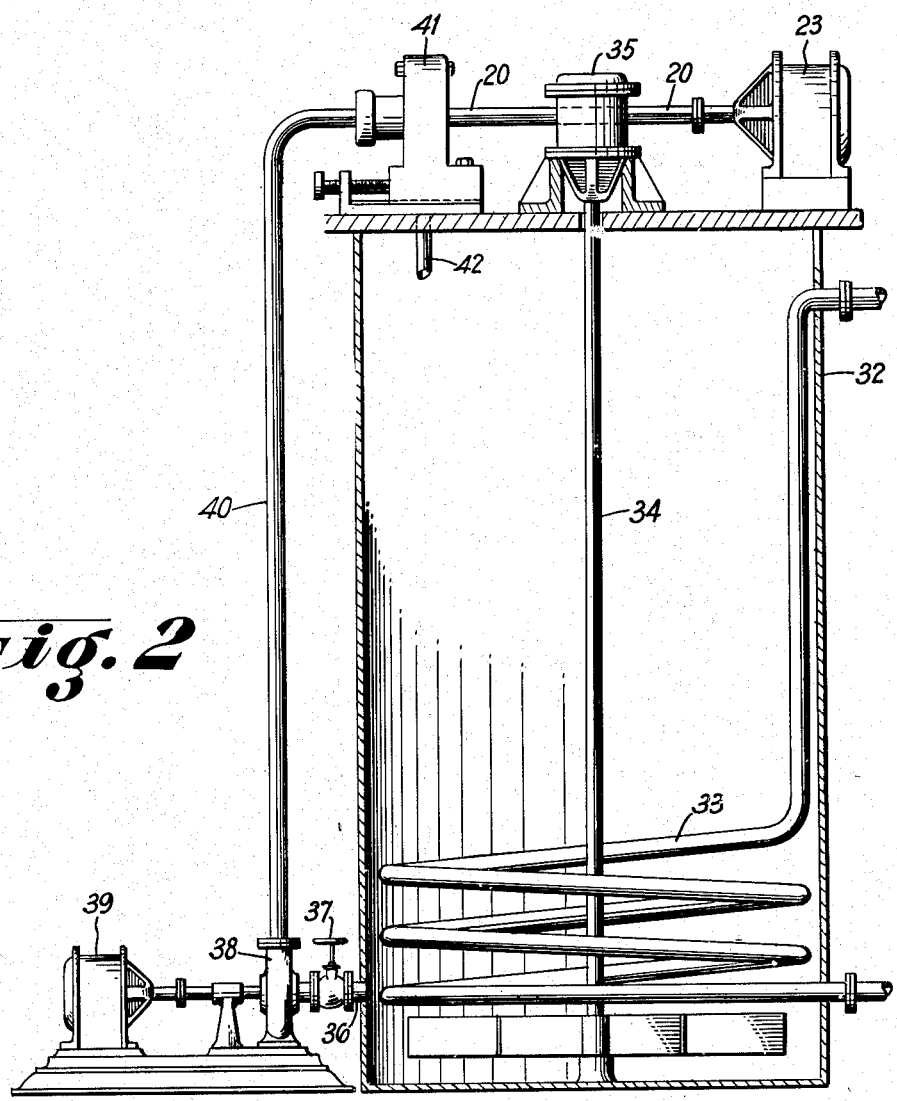

In the accompanying Figs. 2 and 3 of the drawings, a particular manner of applying our testing device is illustrated, such use being in connection with a waste acid centrifugal apparatus commonly employed in such titanium oxide producing operations. In said embodiment we so employ our testing device that the material or element tested becomes subjected to the same character of liquor and under the relatively intense conditions prevailing in the centrifugal apparatus itself. Thus, there is shown in said figures a metallic vessel or container 32 within which a suitable heating or cooling coil 33 is disposed and through which a heating or cooling fluid, such as steam or water, passes for the purpose of regulating to desired degree the prevailing temperature of the waste acid slurry present in said container. Also disposed in operative relationship within said container is a suspended mixer arrangement 34 functioning, when in operation, to maintain the solids content of said slurry in suspended condition while in said container. To effect rotary movement and consequent mixing action on the part of said mixer 34, a motor 35 is provided and suitably suspended above said container. A drawoff or conduit 36 leading from the lower extremity of the container 32 is provided, said conduit being controlled by a valve 37. The conduit 36 communicates with a pump 38 actuated by a motor 39, said pump functioning to discharge at relatively high velocities through a conduit 40 liquor withdrawn from the container 32 to the inlet of our diagrammatically illustrated testing device 41. After passage through said device and direct contact with the material being tested therein, said liquor discharges therefrom, via the conduit 42 communicating with the outlet of said device, for return to container 32.

In operation of a device such as that illustrated in Figs. 2 and 3, the test piece and wear plate, employed in the testing device 41, are carefully cleaned, weighed and measured, and the testing apparatus is then assembled in the same manner as in connection with Fig. 1. A clearance between the test piece and wear plate of approximately $\frac{1}{32}$ of an inch is provided through suitable adjustment, such clearance being maintained throughout the period of test. The valve 36 is opened, waste acid slurry is then pumped or otherwise introduced into the container 32, such introduction continuing until said container becomes substantially three-fourths full. Rotary movement of the mixer arrangement 34 is then effected by actuation of the motor 35, whereby settling of any sludge present in the acidic liquor is prevented. Simultaneously, rotary movement is caused to be imparted to the test piece within the testing device 41 through actuation of the motor 23, and the shaft 20, on the terminus of which is disposed the sample or test piece. Thereupon, pump 38 is set in motion by operation of motor 39, causing the acid slurry to be withdrawn from the container 32 and cycled, via conduits 36 and 40, to and through the testing device 41 back to the container 32 via discharge conduit 42 leading from the testing device outlet 17. As in the instance of Fig. 1, inlet 16, communicating with conduit 40 of the testing device 33, is preferably so positioned as to cause the slurry being introduced therein to flow against the substantial central or axial portion of the rapidly rotating test piece, which slurry then passes through the close clearances prevailing between the stationary wear plate and testing disc, whereby the wear or corrosion effect of said liquor, at the conclusion of a predetermined length of time, can be measured quantitatively after disassembly of the testing device.

Our testing apparatus will be found valuable for preventing failures of valves and other equipment employed in commercial plants since by its use a more accurate determination can be obtained of the corrosion-erosion characteristics of such equipment towards acidic or other liquors, enabling one to more accurately predict prior to use the performance of a given material, and under the most adverse conditions. Furthermore, a highly useful device is provided, whereby the deterioration or resistance characteristics of all types of materials, and especially metallic elements, subjected to erosion and/or corrosion conditions during use, can be obtained; and a medium is afforded through which such results can be arrived at under conditions simulating those actually existing in plant practice.

A comparison of our method of testing with those previously used, such as the "specimen immersion" method, will illustrate the different results and distinct advantages which our invention affords over such prior procedures. In arriving at a final determination, a mere weighing of the test piece will provide a measure of the attack in that the results can be reported as "percentage loss in weight." Preferably, however, we find it more desirable to express the attack results as "inches penetration per month," since this involves a consideration of the area of the specimen and the specific gravity of the alloy or other element under test. Thus, when a sample of ordinary, low carbon steel, alloyed with molybdenum, nickel, or chromium, etc., to impart stain-resistance properties thereto is immersed over night, or for a period of approximately 18 hours in a tank of residual acid liquor from a titanium oxide producing operation, said sample exhibited a corrosion rate of .00000"/mo., whereas when a like sample was tested in accordance with our invention for the same period in a like acid and under comparable conditions of temperature and concentration a corrosion rate of approximately .5" per month was found to result at the conclusion of the test.

Although we prefer to employ a removable wear plate in conjunction with the rotatable testing disc or sample, it will be understood such plate may be entirely dispensed with, and the restricted passage formed for flow of testing liquor provided by utilizing the internal surface of the casing element 12 as an opposing facing surface for the oppositely disposed facing surface of the testing element 22, disposed opposite the casing inlet 16. In general, the primary purpose of the wear plate is to provide an easily renewable element, preventing rapid deterioration of the casing head. A badly corroded plate or casing head would not afford attainment of the uniform, restricted, close clearances desired for liquor flow. Also, it it not essential in testing that the wear plate be also weighed and measured. Functioning to provide a means for forming a restricted passage, weighing and measuring the same merely serves to provide an additional sample tested under somewhat different (stationary as distinguished from rotating) conditions. The erosion effects upon the sample affixed to the rotor obviously will be more pronounced than upon the stationary plate. By employing the plate, however, advantageously one may concurrently test metals or materials of like or unlike composition and, in a single test, ascertain their relative corrosion-erosion resistance characteristics under substantially dissimilar conditions. Accordingly, the stationary wear plate may consist of the same alloy as the rotor or testing disc or the two parts may consist of different materials; a highly resistant or permanent wear plate may be used, if desired, and the determinations made against the rotary test element or disc alone.

Again, while we prefer to adjust and control the clearances between the internal casing section surface or the wear plate and testing disc by means of the described screw arrangement, other means for regulating such clearances may be used. For instance, the restricted passage may be varied by employing stationary plates varying in thickness or by means which enable one to adjust either the rotor or test piece with respect to the casing or wear plate surface, or all of said elements may be independently adjustable, as desired.

We claim as our invention:
1. A testing device comprising in combination a metallic casing provided with an internal chamber, separate inlet and outlet means for said casing communicating with said chamber, additional means within said casing for suspending a material to be subjected to test together with means for imparting rotary motion thereto, and further means spacedly disposed opposite from a surface of the material to be tested, adapted to form a restricted passage through which a medium, the action of which is to be determined, flows in a relatively restricted stream into and out of said chamber.

2. A testing device comprising a metallic casing, an internal chamber in said casing, separate inlet and outlet means for said casing in communication with said chamber, operatively disposed means within said casing provided with means for imparting rotary motion to a test material suspended thereon, and further means a surface of which is oppositely disposed in spaced relationship but in close proximity to a surface of the material under test, forming a restricted passage through which a liquor, the action of which upon the material under test is to be determined, must flow in a relatively restricted stream into and out of said chamber.

3. A testing device comprising in combination a corrosion-resistant metallic casing, a chamber internally of said casing, casing inlet and outlet means in open communication with said chamber, operatively disposed means positioned within said casing provided with means for imparting rotary motion to a metallic element suspended thereon and to be subjected to test, and a stationary, removable plate oppositely disposed in spaced relationship from but in close proximity to a surface of said metallic element, forming a restricted passage through which a testing liquor must flow in a relatively restricted stream during its passage through said chamber.

4. A testing device comprising a corrosion-resistant metallic casing, a separate inlet and outlet therefor, a chamber internally of said casing, operatively disposed, rotatable means in said chamber provided with means for retaining an article to be subjected to attack by a contacting medium, means for rotating said operatively disposed means, a removable corrosion-resistant wearing plate provided with a surface oppositely disposed in spaced relationship from a surface of said article, said opposing surfaces being so arranged with respect to each other as to form a restricted passage through which said contacting medium must flow in a restricted stream after introduction into said casing through said inlet at a point substantially co-axial with said retaining means and for passage through said restricted passage to said outlet.

5. A testing device comprising in combination a metallic casing, a chamber internally of said casing, separate casing inlet and outlet means communicating with said chamber, means comprising a rotatable element for suspending an article for test within said chamber, means for rotating said element, additional means disposed opposite to and in spaced relationship from a surface of said article, said opposing surfaces being so arranged with respect to each other as to form a restricted passage through which an attacking liquor flows in a substantially restricted stream from said inlet to said outlet, and means for varying and controlling the cross-sectional area of said restricted passage.

6. A testing device comprising a corrosion-resistant metallic casing, an inlet and outlet therefor, a chamber internally of said casing, operatively-disposed means in said chamber adapted to retain an article to be subjected to attack by a contacting liquor, means for imparting high speed rotary motion to said latter means, a removable corrosion-resistant wearing plate provided with a surface oppositely disposed from a surface of said article, said opposing surfaces being so arranged with respect to each other as to form a restricted passage through which said contacting liquor must flow after its introduction through said inlet at a point substantially co-axial with said retaining means and for passage through said outlet, and means for varying the cross-sectional area between the opposing surfaces of said article and wearing plate.

7. A testing device for determining the action of corrosive or erosive liquid upon an article subjected to direct contact therewith, comprising a corrosion-resistant metallic casing having a separate inlet and outlet, a chamber in said casing in open communication with said inlet and outlet, a high speed rotary element disposed in said chamber provided with releasably securing means for retaining an article thereon during its subjection to the contacting testing liquid, means for imparting rotary movement to said element, a removable, corrosion-resistant wearing plate having a surface oppositely and spacedly disposed from a surface of the article undergoing test on said rotatable element, the opposing surfaces of said plate and article being so arranged with respect to each other that a restricted passage is formed therebetween through which the contacting testing liquid flows after introduction into said chamber at a point substantially coaxial with said rotatable element, for passage to said outlet, and an adjustable screw element associated with said casing for varying and controlling the cross sectional area between the opposing surfaces of said test article and wearing plate.

MARSELIO GUIDO FONTANA.
GARRETT REED CANTWELL.
PHILIP GEORGE SCHWAAB, Jr.